United States Patent [19]

Lozito

[11] Patent Number: 5,424,083
[45] Date of Patent: Jun. 13, 1995

[54] SELF CONTAINED DISPOSABLE COFFEE BREWING DEVICE

[76] Inventor: Michael C. Lozito, 708 Mallard Way, Peekskill, N.Y. 10566

[21] Appl. No.: 327,997

[22] Filed: Oct. 24, 1994

[51] Int. Cl.$^6$ .................. B65D 81/34; A23F 5/26; A23F 3/18
[52] U.S. Cl. ..................... 426/82; 426/77; 426/433; 426/435; 426/110; 99/295; 99/306
[58] Field of Search .................. 426/77–84, 426/112, 110, 433, 435; 229/125.03, 117.09, 117.12, 117.13, 117.22; 215/228; 220/768, 769, 763, 212.5; 99/295, 306; 206/0.5

[56] References Cited

U.S. PATENT DOCUMENTS

| D. 343,271 | 1/1994 | Kenney | 426/82 |
|---|---|---|---|
| 2,413,686 | 1/1947 | Barnett | 426/82 |
| 2,451,195 | 10/1948 | Brown | 99/295 |
| 2,715,868 | 8/1955 | Brown | 99/295 |
| 2,822,273 | 2/1958 | Anderson | 99/295 |
| 3,279,926 | 10/1966 | Aguirre-Batres | 426/82 |
| 3,292,527 | 12/1966 | Stasse | 426/77 |
| 3,446,624 | 5/1969 | Luedtke | 99/295 |
| 3,483,812 | 12/1969 | Gast et al. | 99/295 |
| 3,579,351 | 5/1971 | Wege et al. | 426/82 |
| 3,615,708 | 10/1971 | Abile-Gal | 426/77 |
| 3,628,444 | 12/1971 | Marra | 99/295 |
| 3,833,740 | 9/1974 | Schmidt | 426/77 |
| 3,899,599 | 8/1975 | Rambold | 426/82 |
| 4,443,481 | 4/1984 | Donarumma et al. | 426/77 |
| 4,715,271 | 12/1987 | Kitagawa | 99/306 |
| 4,763,833 | 8/1988 | Stoll | 229/117.12 |
| 4,806,369 | 2/1989 | Thompson | 426/77 |
| 4,821,630 | 4/1989 | Roberts | 426/77 |
| 4,981,588 | 1/1991 | Poulallion | 426/77 |
| 5,055,311 | 10/1991 | Brauer et al. | 426/82 |
| 5,108,768 | 4/1992 | So | 426/77 |
| 5,125,327 | 6/1992 | Winnington-Ingram | 99/306 |
| 5,135,764 | 8/1992 | Clausi et al. | 426/241 |
| 5,242,702 | 9/1993 | Fond | 426/433 |
| 5,298,267 | 3/1994 | Gruenbaeher | 426/433 |
| 5,325,765 | 7/1994 | Sylvan | 99/295 |
| 5,363,745 | 11/1994 | Lin | 99/306 |

FOREIGN PATENT DOCUMENTS

| 2530446 | 1/1984 | France | 426/77 |
|---|---|---|---|
| 2327264 | 1/1975 | Germany | 426/77 |

Primary Examiner—Steven Weinstein
Attorney, Agent, or Firm—Goldstein & Associates

[57] ABSTRACT

The invention is a self contained disposable coffee brewing cone comprising a pouch having an inside, a top, a bottom, an open circular top, and a permeable circular bottom. A pre-measured volume of coffee is located inside the pouch at the bottom, and is sandwiched between a permeable filter net and the permeable circular bottom. A flange is located at the top of the pouch, extending radially outward from the pouch, parallel to the horizon. The flange has a flange tab and perforations along its center, so that an outer flange ring may be peeled back and separated from an inner flange ring and the remainder of the pouch, to be utilized as a handle.

7 Claims, 2 Drawing Sheets

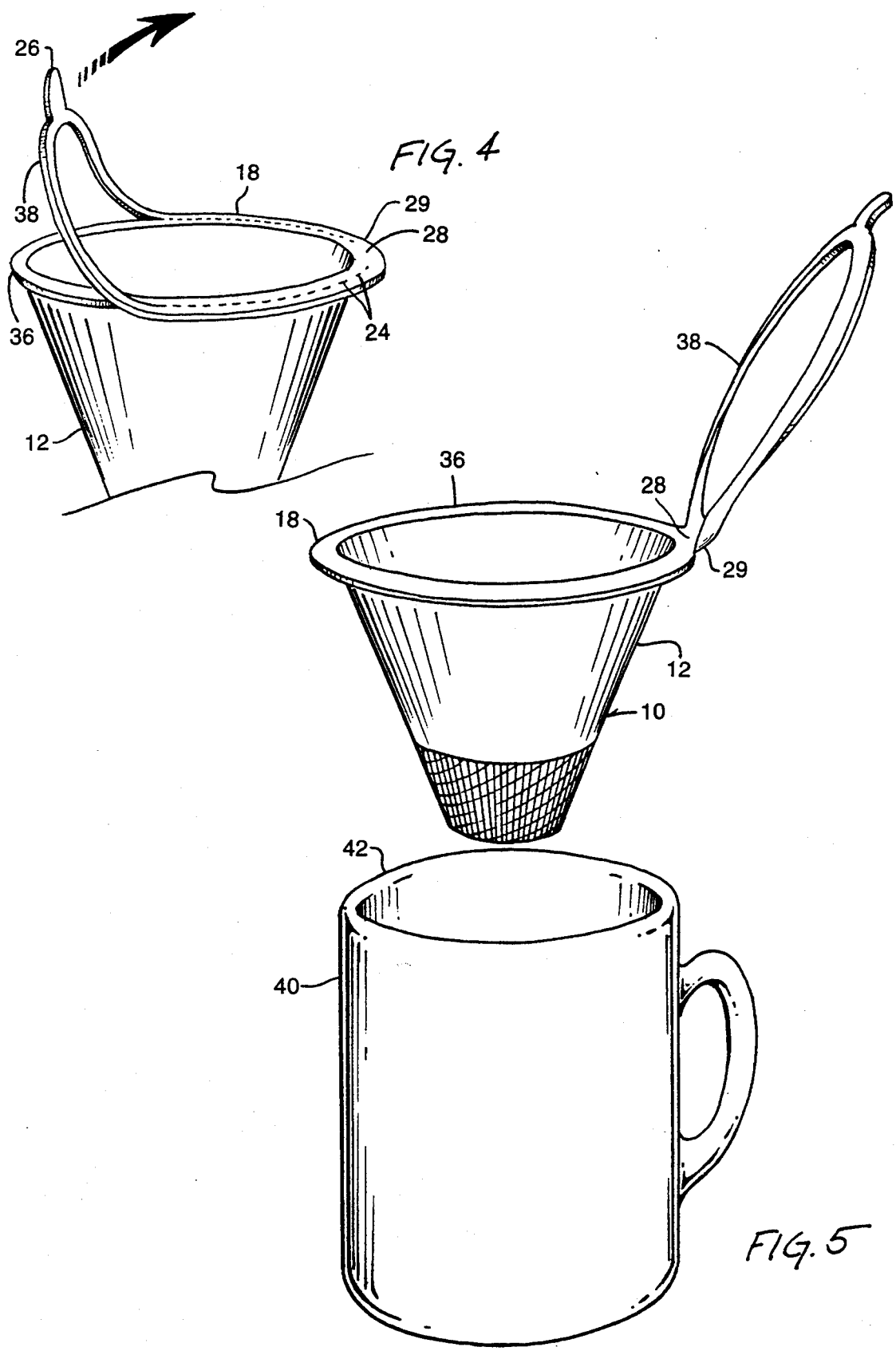

SELF CONTAINED DISPOSABLE COFFEE BREWING DEVICE

BACKGROUND OF THE INVENTION

The invention relates to a self contained disposable coffee brewing cone. More particularly, the invention relates to a disposable coffee brew cone for brewing a single cup of coffee without the need for using traditional coffee brewing methods and apparatus.

The public's demand for fresh brewed coffee is voracious. Coffee drinkers enjoy their coffee from morning until night, at home and at work. This huge demand for fresh brewed coffee has resulted in the wide spread development and purchase of traditional coffee brewing apparatus such as the gravity-drip coffee maker. Indeed, such devices have become commonplace in most homes and offices.

However, these devices are not well suited for brewing an individual cup of coffee. Coffee must be removed from one receptacle (usually a can or vacuum packed bag) and placed in measured doses into the filter and basket housing of these traditional coffee brewing devices. This inconvenience of measuring ground coffee, cleaning up spent coffee grounds, and then cleaning the device itself can prove to be a significant deterrent to coffee drinkers who only desire a single cup of coffee. Furthermore, it is not feasible for a coffee drinker to brew an entire pot of coffee only to drink one cup, since coffee significantly loses its flavor and taste with time, and thus is not likely to be re-heated and re-used. Conversely, to brew an entire pot of coffee for only one serving proves inefficient and wasteful of expensive coffee grinds.

Because of these drawbacks, coffee drinkers have been forced to resort to the ease and convenience of products like instant coffee that provides a significantly less flavorful cup of coffee than that provided by traditional brew methods. Consumers are also forced to resort to the likes of tea-bag type coffee pouches and microwave brew pouches, such as that disclosed by U.S. Pat. No. 5,135,764 to Clausi et al. Although less time consuming and complex than traditional coffee brewing methods, these methods and apparatus also result in significant flavor loss since they usually entail submerging a coffee filled pouch into a cup of boiling water, similar to the way one would go about preparing a cup of tea. Unlike a cup of tea that may be properly prepared by immersing filter-encased tea leaves into boiling water, a proper cup of coffee can only result from dripping or percolating boiling water through coffee grinds, as is done with most home coffee machines. By simply immersing a pouch of coffee into boiling water, the water is unable to come into contact with and extract flavor from a sufficient volume of coffee grinds. The result is a weak, flavorless cup of coffee.

Coffee brewing devices present in the art have recognized these drawbacks, and have attempted unsuccessfully to remedy them. The present art discloses individual disposable brewing devices that are mounted directly on a receiving receptacle, as for example in U.S. Pat. No. 4,715,271 to Kitigawa, and U.S. Pat. No. 5,055,311 to Brauer Jr. et al. However, these devices have serious drawbacks. U.S. Pat. No. 4,715,271 to Kitigawa discloses a disposable beverage brewer comprising fixed notches along the bottom of the apparatus which are to be seated over the lip of a receiving receptacle. Because these notches are fixed, the number of receptacles that may accept this apparatus is severely limited. These notches also provide inadequate support for the device, thus causing it to be highly prone to tipping and spillage. Also, because of its triangular shape, this device fails to completely enclose the top lip of the receptacle that it is engaged with, and may leak or allow spillage on to the work surface or table.

U.S. Pat. No. 5,055,311 to Brauer Jr. et al. discloses a disposable coffee-brewing apparatus which is independent of and to be suspended above a coffee receptacle. Because this devices relies on support from the same surface that supports the coffee receptacle, it is highly prone to tipping, especially due to its high center of gravity. The force of water being poured from a height into the device can easily cause it to tip. In addition, because it operates independently of the coffee receptacle, the device does not permit the coffee receptacle to be easily moved without having to also move the device. So, for instance, one wishing to move his coffee cup from one location to another would need to find a new suitable platform large enough to support both the coffee receptacle and the device together.

While these units may be suitable for the particular purpose employed, or for general use, they would not be as suitable for the purposes of the present invention as disclosed hereafter.

SUMMARY OF THE INVENTION

The present invention discloses a disposable, single-cup coffee brewing apparatus intended to overcome the prior art deficiencies. It is an object of the invention to provide an apparatus for brewing individual cups of coffee wherein coffee grinds are self contained and pre-measured, and need not be transferred from a separate container. The invention is simply placed on top of or held above any sized coffee receptacle, and hot water is poured into it which runs through a filter net and pre-packed coffee grinds directly into the coffee receptacle.

It is another object of the invention to provide an apparatus for brewing coffee that can produce a single cup of coffee which possesses the same taste and flavor quality equivalent to that found in multi-cup brewing devices. Since the invention works on the same principles as such traditional devices, namely a drip method, the same full flavored cup of coffee is achieved. By dripping down through the coffee grinds which are encased within the filter element of the instant invention, the full flavor of the coffee is extracted from the grinds and delivered into the coffee receptacle. However, since only a one-cup dosage of coffee grinds is used, the unnecessary wasting of expensive coffee can be avoided. Furthermore, the time consuming clean-up requirements inherent in traditional coffee brewing devices are absent.

It is yet another object of the invention to provide a device for brewing single servings of coffee which may be utilized in conjunction with almost any sized coffee receptacle. Because of its tapered, conical shape and wide top flange, the instant invention is capable of being securely seated upon an almost limitless number of varying sized coffee receptacles, without any danger of tipping or spillage. In one possible installation, the cone may be inserted into the coffee receptacle until the outer tapering walls of the cone are too large to fit any further into the receptacle, thus creating a snug fit. In another possible installation, the cone may be inserted into a coffee receptacle until the outwardly extending flange rests upon the lip of the receptacle, thus suspending the device above the bottom of the receptacle. The device, once seated upon a coffee receptacle in either of these manners may also be easily moved about by simply moving the coffee receptacle. Furthermore, in the event that a coffee receptacle is of such an odd shape or size that the instant invention cannot be securely seated upon the top of such receptacle, a handle is provided which allows a user to safely and conveniently suspend the invention above a coffee receptacle while pouring water through it.

It is a further object of the invention to provide a device that can brew single servings of coffee without any leakage. Due to the tapered conical shape of the instant invention, any water poured into the top of the device will be automatically funneled down to the apex of the cone, where it will exit the cone in a narrow stream, entering directly into the coffee receptacle. The non-porous surface of the upper portion of the cone prevents hot water which is poured into the top of the device from leaking out of the sides.

The invention is a self contained disposable coffee brewing cone comprising a pouch having an inside, a top, a bottom, an open circular top, and a permeable circular bottom. A pre-measured volume of coffee is located inside the pouch at the bottom, and is sandwiched between a permeable filter net and the permeable circular bottom. A flange is located at the top of the pouch, extending radially outward from the pouch, parallel to the horizon. The flange has a flange tab and perforations along its center, so that an outer flange ring may be peeled back and separated from an inner flange tab and the remainder of the pouch, and utilized as a handle.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 4 is a diagrammatic perspective view of the instant invention with its outer ring being pulled back.

FIG. 5 is a diagrammatic perspective view of the instant invention in use.

DETAILED DESCRIPTION OF THE PREFERRED EMBODIMENTS

Figure 1:
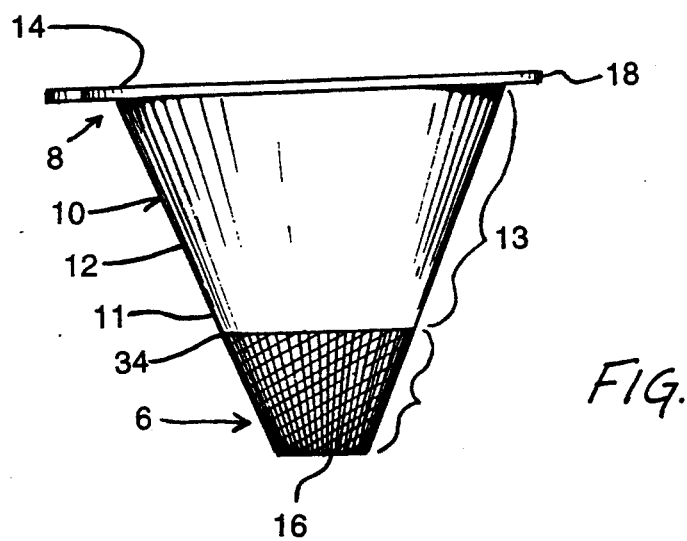
FIG. 1 is a side elevational view of the instant invention.

FIG. 1 illustrates a side elevational view of the instant invention 10. The invention 10 has a top 8 and a bottom 6, and comprises a pouch 11 having an open circular top 14 and a permeable circular bottom 16. The pouch 11 may also comprise a cone shaped body 12 which tapers from the bottom 6 toward the top 8. The permeable circular bottom 16 of pouch 11 is substantially flat. A flange 18 is located at the top 8 of the pouch 11, and extends parallel to the horizon.

Figure 2:
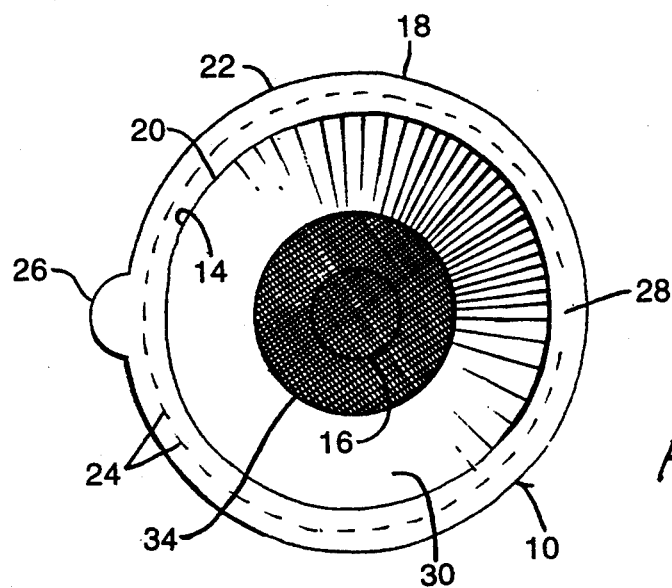
FIG. 2 is a plan view of the instant invention.

FIG. 2 illustrates a plan view of the instant invention 10, having an inside 30. The flange 18 extends around the entire circumference of the open circular top 14, projecting radially outward, and has an inner edge 20 and an outer edge 22. The flange 18 also has an axis which is concentric with that of the open circular top 14. The flange 18 is preferably rigid so that it may rest on a lip of a typical coffee receptacle and support the instant invention 10 therefrom. A flange tab 26 projects from the outer edge 22 of the flange 18. A series of perforations 24 are disposed along the center of the flange 18 parallel to and in between the inner edge 20 and outer edge 22 of the flange 18. The perforations 24 continue along the length of the flange 18 to a point directly opposite the flange tab 26, where an un-perforated area 28 is located.

On the inside 30 of the instant invention 10 is a pre-measured volume of coffee which is trapped within the cone shaped body 12 between a permeable filter net 34 and the permeable circular bottom 16.

Figure 3:
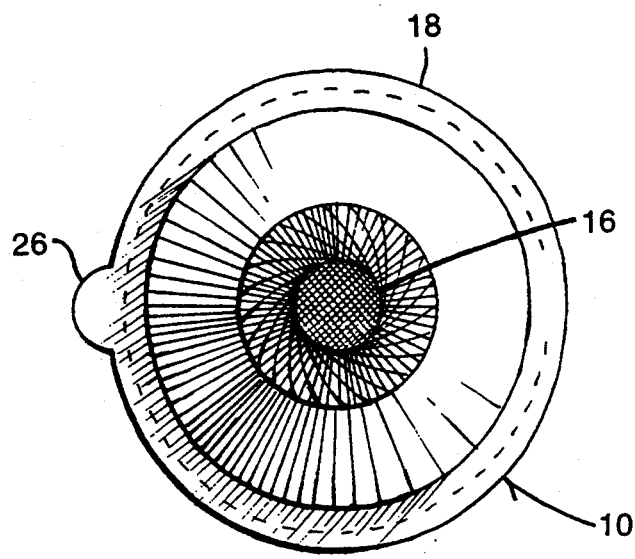
FIG. 3 is a bottom plan view of the instant invention.

FIG. 3 illustrates a bottom plan view of the instant invention 10. The permeable circular bottom 16 is shown, as is the flange 18 and flange tab 26.

FIG. 4 illustrates the flange 18 being pulled back along the perforations 24. By pulling on the flange tab 26, the flange 18 is separated along the perforations 24, creating an inner flange ring 36 and an outer flange ring 38.

Referring to both FIG. 4 and FIG. 5, it can be seen that by separating the outer flange ring 38 from the inner flange ring 36 along the perforations 24, the outer flange ring 38 remains connected to the inner flange ring 36 only by the un-perforated area 28 which forms a connector 29. The connector 29 connects the peeled back outer flange ring 38 to the inner flange ring 36 and cone shaped body 12 so that the outer flange ring 38 may be utilized as a handle, as best illustrated in FIG. 5.

FIG. 5 illustrates the instant invention 10, with the outer ring 38 peeled back and being used as a handle. The instant invention 10 may either be seated on top of a typical coffee receptacle 40 by resting the flange 18 on top of a lip 42 of the typical coffee receptacle, or the instant invention 10 may be suspended above or lifted from the typical coffee receptacle 40 by utilizing the peeled back outer flange ring 38 as a handle, as described above.

Referring back to FIG. 1, it should be noted that an optional embodiment of the instant invention 10 might entail constructing an upper portion 13 of the cone shaped body 12 of completely non-porous material to prevent fluid from seeping through the cone shaped body 12 during use. This non-porous upper portion 13 would preferably extend from the permeable filter net 34 toward the top 8 where the flange 18 is located. A lower portion 15 comprising the area below the permeable filter net 34 could be constructed of porous material similar to that of the permeable circular bottom 16, thus allowing hot water which has been poured into the open circular top to exit the instant invention through either the permeable circular bottom 16 or any other area of the lower portion 15. Alternatively, the entire lower portion 15 can be constructed of non-porous material so that fluid which has been introduced into the instant invention 10 via the open circular top 14 can only exit the instant invention 10 by means of the permeable circular bottom 16.

What is claimed is:

1. A self contained disposable coffee brewing device comprising:

a pouch, said pouch having a sidewall, an open circular top, and a liquid permeable circular bottom;

a pre-measured volume of coffee located inside the pouch at the bottom;

a liquid permeable filter net located inside the pouch and above said pre-measured volume of coffee, such that said per-measured volume of coffee is sandwiched between the liquid permeable filter net and the liquid permeable circular bottom; and a flange extending around the entire circumference of the open circular top at said open circular top and extending from the pouch, radially outwardly, parallel to the horizontal, said flange being sufficiently rigid such that the flange is capable of resting on a lip of a coffee receptacle and support said brewing device therefrom, said flange comprising:

a circumferential outer edge and an inner edge;

a flange tab projecting from the outer edge of the flange; and a line of perforations disposed along the center of said flange, said line of perforations oriented concentric to the inner and outer edges of said flange, said line of perforations dividing the flange into an inner flange ring and an outer flange ring, said line of perforations continuing along the perimeter of the flange to a point opposite the tab, where the perforations end, leaving a portion of the flange that is completely un-perforated between its inner and outer edge to form a connector, connecting the outer flange ring to the inner flange ring and pouch such that upon grasping the flange tab and pulling the flange tab back along the perforations, the outer flange ring separates from the inner flange ring and the pouch along the perforations but remains connected to the inner flange ring and the pouch only at the connector such that the separated outer ring can be used as a handle to support and manipulate the pouch.

2. The coffee brewing device as recited in claim 1, wherein the pouch has a cone shaped body, tapering from the bottom which is substantially flat, upwards and outwards toward the open circular top.

3. The apparatus as recited in claim 2, wherein an upper portion of the cone shaped body is located above the liquid permeable filter net and is comprised of a liquid impermeable material to prevent any seepage of water through the upper portion, and thus prevent leakage or spillage.

4. The apparatus as recited in claim 2, wherein the entire cone shaped body is constructed of liquid impermeable material so that hot fluid can exit only via the liquid permeable circular bottom.

5. A method for brewing an individual fresh cup of coffee, using the self contained disposable coffee brewing device recited in claim 1, comprising the steps of:

placing the coffee brewing device recited in claim 1 on top of a coffee receptacle having a lip so that the flange rests on top of the coffee receptacle lip and the liquid permeable circular bottom is located inside the coffee receptacle; and pouring hot water into the open circular top of the coffee brewing device.

6. The method as recited in claim 5, further comprising the steps of:

pulling on the flange tab so as to separate the flange tab and outer flange ring from the inner flange ring;

pulling the flange tab and outer flange ring back along the flange perforations toward the unperforated portion so that the outer flange ring is substantially separated from the inner flange ring, being fastened to the inner flange ring only by means of the un-perforated connector portion;

bending the separated outer flange ring back, and pinching its inner edges toward one another so as to create a bend at the flange tab and provide extra rigidity to the outer flange ring in its separated state; and lifting the coffee brewing device out of the coffee receptacle by utilizing the separated and peeled back outer flange ring as a handle and applying upward force thereto.

7. A method for brewing an individual fresh cup of coffee using the coffee brewing device of claim 1 comprising the steps of:

applying upward force on the flange tab of the coffee brewing device of claim 1 so as to separate the flange tab and outer flange ring from the inner flange ring;

pulling the flange tab and outer flange ring up and back along the perforations toward the un-perforated portion so that the outer flange ring is substantially separated from the inner flange ring, being fastened to the inner flange ring only by means of the un-perforated connector portion;

bending the separated outer flange ring back, and pinching its inner edges toward one another so as to create a bend at the flange tab and provide extra rigidity to the outer flange ring in its separated state;

grasping the separated outer flange ring as a handle, and suspending the coffee brewing device of claim 1 above a coffee receptacle having an opening so that the liquid permeable bottom is located directly above the opening of said coffee receptacle; and pouring hot water into the open circular top of the coffee brewing device of claim 1, the hot water exiting the device through the liquid permeable bottom as fresh brewed coffee and entering the coffee receptacle.

* * * * *